United States Patent
Lin

(10) Patent No.: US 12,070,685 B2
(45) Date of Patent: Aug. 27, 2024

(54) OBJECT DISPLAY METHOD AND APPARATUS, STORAGE MEDIUM, AND ELECTRONIC DEVICE

(71) Applicant: TENCENT TECHNOLOGY (SHENZHEN) COMPANY LIMITED, Shenzhen (CN)

(72) Inventor: Kongwei Lin, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 114 days.

(21) Appl. No.: 17/848,293

(22) Filed: Jun. 23, 2022

(65) Prior Publication Data

US 2022/0314116 A1    Oct. 6, 2022

Related U.S. Application Data

(63) Continuation of application No. 17/078,059, filed on Oct. 22, 2020, which is a continuation of application No. PCT/CN2019/111635, filed on Oct. 17, 2019.

(30) Foreign Application Priority Data

Nov. 15, 2018    (CN) .......................... 201811361960.5

(51) Int. Cl.
*A63F 13/537*    (2014.01)
*A63F 13/25*    (2014.01)

(52) U.S. Cl.
CPC ............ *A63F 13/537* (2014.09); *A63F 13/25* (2014.09)

(58) Field of Classification Search
None
See application file for complete search history.

(56) References Cited

U.S. PATENT DOCUMENTS 7,654,900 B2    2/2010    Yoshinaga et al.
10,642,485 B1    5/2020    Seo et al.
(Continued)

FOREIGN PATENT DOCUMENTS

CN    102043581 A    5/2011
CN    103870131 A    6/2014
(Continued)

OTHER PUBLICATIONS

The World Intellectual Property Organization (WIPO) International Search Report for PCT/CN2019/111635 Jan. 16, 2020 6 Pages (including translation).

(Continued)

*Primary Examiner* — Ronald Laneau
(74) *Attorney, Agent, or Firm* — ANOVA LAW GROUP PLLC

(57) ABSTRACT

An object display method is provided for a terminal. The method includes displaying a first object in an object display region in a game interface and, after detecting a first operation performed on the first object, displaying a second object in the game interface in response to the first operation. The first object is used for controlling, in response to a second operation performed on the first object, a game character to perform a first target operation, and the second object is used for controlling, in response to a third operation performed on the second object, the game character to perform a second target operation.

20 Claims, 9 Drawing Sheets

(56) References Cited

U.S. PATENT DOCUMENTS

| | | |
|---|---|---|
| 10,754,383 B2 | 8/2020 | Lee |
| 2003/0011638 A1 | 1/2003 | Chung |
| 2014/0101577 A1 | 4/2014 | Kwak et al. |
| 2015/0317120 A1 | 11/2015 | Kim et al. |
| 2016/0103606 A1 | 4/2016 | Huang et al. |
| 2017/0038946 A1 | 2/2017 | Deng et al. |
| 2020/0301578 A1 | 9/2020 | Guo et al. |
| 2021/0001232 A1 | 1/2021 | Tang et al. |
| 2021/0038987 A1* | 2/2021 | Lin ............... A63F 13/537 |
| 2022/0023761 A1* | 1/2022 | Li ................. A63F 13/218 |
| 2022/0032186 A1* | 2/2022 | Wan ................ A63F 13/56 |
| 2022/0054939 A1* | 2/2022 | Wei .............. A63F 13/2145 |
| 2023/0141406 A1* | 5/2023 | Liu ................ A63F 13/58 463/31 |
| 2023/0321543 A1* | 10/2023 | Chen ............... A63F 13/55 463/31 |

FOREIGN PATENT DOCUMENTS

| | | |
|---|---|---|
| CN | 106293461 A | 1/2017 |
| CN | 106730810 A | 5/2017 |
| CN | 107132971 A | 9/2017 |
| CN | 107132979 A | 9/2017 |
| CN | 107930122 A | 4/2018 |
| CN | 108459811 A | 8/2018 |
| CN | 108579086 A | 9/2018 |
| CN | 109513208 A | 3/2019 |
| EP | 1278116 A1 | 1/2003 |

OTHER PUBLICATIONS

The State Intellectual Property Office of the People's Republic of China (SIPO) Office Action 1 for 201811361960.5 Feb. 6, 2020 11 Pages (including translation).

The State Intellectual Property Office of the People's Republic of China (SIPO) Office Action 2 for 201811361960.5 Sep. 25, 2020 10 Pages (including translation).

Xin Qiu, "Shortcut or burden? Talk about the pros and cons of 3D Touch", [online] URL: http://m.zol.com.cn/article/5417395.html, Sep. 17, 2015 (Sep. 17, 2015), The entire passage. 13 Pages (including translation).

* cited by examiner

OBJECT DISPLAY METHOD AND APPARATUS, STORAGE MEDIUM, AND ELECTRONIC DEVICE

RELATED APPLICATIONS

This application is a continuation application of U.S. application Ser. No. 17/078,059 filed on Oct. 22, 2020. U.S. application Ser. No. 17/078,059 is a continuation application of PCT Patent Application No. PCT/CN2019/111635, filed on Oct. 17, 2019, which claims priority to Chinese Patent Application No. 201811361960.5, entitled "OBJECT DISPLAY METHOD AND APPARATUS, STORAGE MEDIUM, AND ELECTRONIC DEVICE" and filed with the National Intellectual Property Administration, PRC on Nov. 15, 2018, content of all of which is incorporated herein by reference in their entirety.

FIELD OF THE TECHNOLOGY

This application relates to the field of computer technologies and, specifically, to an object display method and apparatus, storage medium, and electronic device.

BACKGROUND

In the current game interface design, an object (for example, a skill of a game character) in a game interface and a user interface-object icon (UI-ICON) are in a one-to-one correspondence. That is, an ICON on a UI is tapped or clicked to perform a fixed operation, for example, to release a fixed skill. When an ICON at a UI position of an object corresponds to a fixed operation, the number of operations that can be brought into game experience in a single game is limited by the screen size and the trigger range. In a case that the size of the UI and the size of the ICON remain unchanged, if more UIs are added, an actual visual range of the game is smaller. However, if the UI and the ICON are scaled down to satisfy a requirement for adding more UIs, a trigger range of the object ICON is also scaled down. The disclosed methods and systems are directed to solve one or more problems set forth above and other problems.

SUMMARY

Embodiments of the present disclosure provide an object display method and apparatus, a storage medium, and an electronic device, to resolve at least the technical problem in the related art that display space occupied by an object in a game interface is relatively large and consequently the utilization of the display space of the game interface is relatively low.

According to an aspect of the embodiments of the present disclosure, an object display method is provided for a terminal. The method includes displaying a first object in an object display region in a game interface and, after detecting a first operation performed on the first object, displaying a second object in the game interface in response to the first operation. The first object is used for controlling, in response to a second operation performed on the first object, a game character to perform a first target operation, and the second object is used for controlling, in response to a third operation performed on the second object, the game character to perform a second target operation.

According to another aspect of the embodiments of the present disclosure, a terminal device is provided. The terminal device includes a memory storing computer program instructions, and a processor coupled to the memory. When executing the computer program instructions, the processor is configured to perform: displaying a first object in an object display region in a game interface and, after detecting a first operation performed on the first object, displaying a second object in the game interface in response to the first operation. The first object is used for controlling, in response to a second operation performed on the first object, a game character to perform a first target operation, and the second object is used for controlling, in response to a third operation performed on the second object, the game character to perform a second target operation.

According to another aspect of the embodiments of the present disclosure, a non-transitory computer-readable storage medium is further provided. The non-transitory computer-readable storage medium stores computer program instructions executable by at least one processor to perform: displaying a first object in an object display region in a game interface and, after detecting a first operation performed on the first object, displaying a second object in the game interface in response to the first operation. The first object is used for controlling, in response to a second operation performed on the first object, a game character to perform a first target operation, and the second object is used for controlling, in response to a third operation performed on the second object, the game character to perform a second target operation.

Other aspects of the present disclosure can be understood by those skilled in the art in light of the description, the claims, and the drawings of the present disclosure.

BRIEF DESCRIPTION OF THE DRAWINGS

The accompanying drawings described herein are used for providing further understanding of the present disclosure, and form a part of the present disclosure. Exemplary embodiments of the present disclosure and descriptions thereof are used for explaining the present disclosure, and do not constitute any inappropriate limitation to the present disclosure. In the accompanying drawings.

DESCRIPTION OF EMBODIMENTS

The technical solutions in embodiments of the present disclosure are described below with reference to the accompanying drawings. Apparently, the described embodiments are merely some rather than all of the embodiments of the present disclosure. All other embodiments obtained by a person of ordinary skill in the art based on the disclosed embodiments of the present disclosure without creative efforts shall fall within the protection scope of the present disclosure.

The terms such as "first" and "second" in the specification, claims, and accompanying drawings of the present disclosure are intended to distinguish between similar objects, but are not necessarily used for describing a specific sequence or a chronological order. It is to be understood that the data termed in such a way is interchangeable in proper circumstances, so that the embodiments of the present disclosure described herein can be implemented in other orders than the order illustrated or described herein. Moreover, the terms "include" and "have" and any other variants mean to cover the non-exclusive inclusion. For example, a process, method, system, product, or device that includes a series of steps or units is not necessarily limited to those expressly listed steps or units, but may include other steps or units not expressly listed or inherent to such a process, method, system, product, or device.

Figure 1:
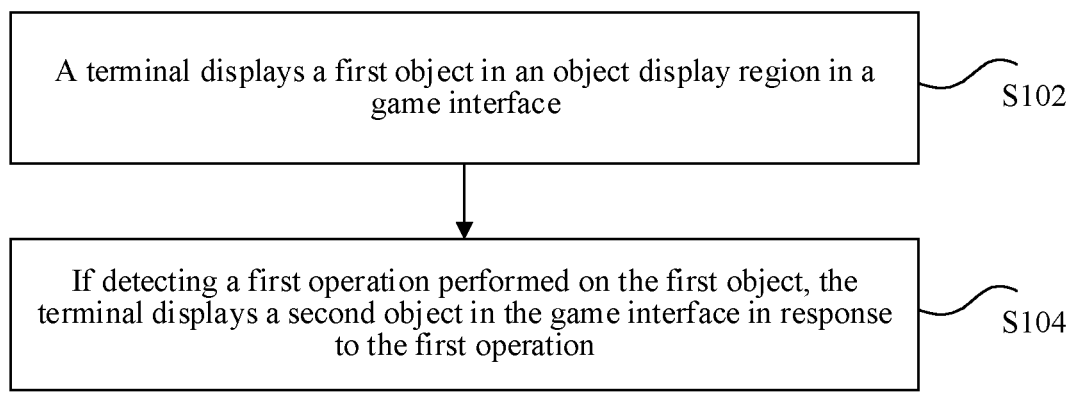
FIG. 1 is a schematic diagram of an object display method according to an embodiment of the present disclosure.

According to an aspect of the embodiments of the present disclosure, an object display method is provided. The method may be applied to a terminal. The terminal may be an intelligent terminal, for example, a device such as a smartphone, a computer, a personal digital assistant (PDA), or a tablet computer. As shown in FIG. 1, the method includes the followings.

S102: A terminal displays a first object in an object display region in a game interface.

S104: If detecting a first operation performed on the first object, the terminal displays a second object in the game interface in response to the first operation.

The first object may be used for controlling, in response to a second operation performed on the first object, a game character to perform a first target operation, and the second object is used for controlling, in response to a third operation performed on the second object, the game character to perform a second target operation.

Figure 2:
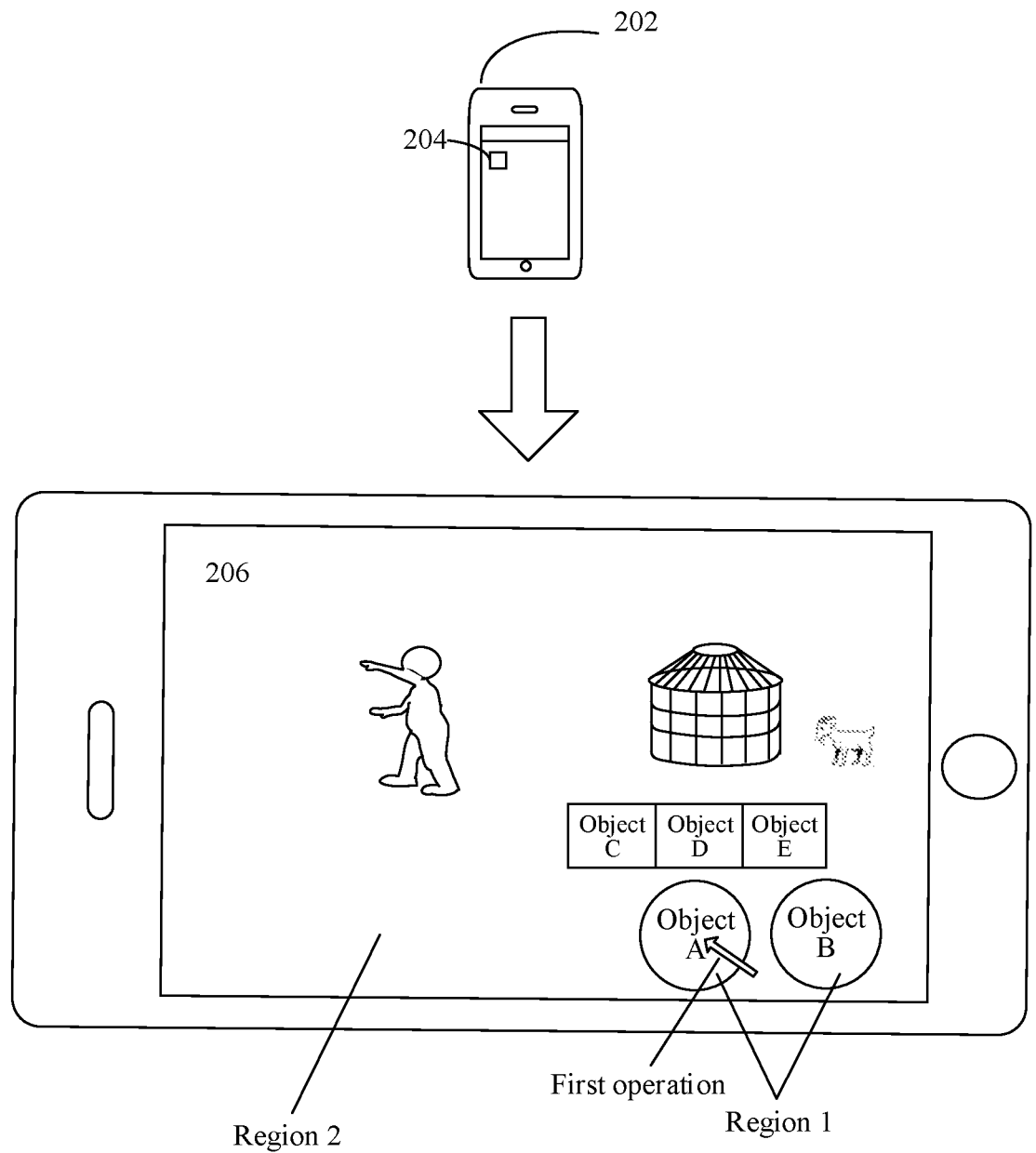
FIG. 2 is a schematic diagram of an application environment of an object display method according to an embodiment of the present disclosure.

In one embodiment, the object display method may be applied to a hardware environment formed by a terminal 202 shown in FIG. 2. As shown in FIG. 2, a game client 204 is installed on the terminal 202, and a user taps or clicks the game client 204 to enter the game.

A game interface 206 is displayed on the full screen of the terminal 202. A game scene, a game character, icons of first objects (an object A and an object B) that are operable, and the like are displayed in the game interface 206. In the game interface, a region in which the icons of the first objects (the object A and the object B) are displayed is an object display region, and the remaining region is a non-object display region.

The client 204 displays the first objects (the object A and the object B) in the object display region (a region 1) in the game interface. In a case that a first operation performed on the object A in the first objects is detected, second objects (an object C, an object D, and an object E) are displayed in the game interface in response to the first operation. For example, the second object may be displayed in the non-object display region (a region 2) in the game interface.

In one embodiment, the object display method may be applied to, but not limited to, a scenario in which an object is displayed in a game interface. The client may be various types of game applications, game applets, game websites, and the like, for example, a horizontal-version action game, a casual puzzle game, an action shooting game, a sports racing game, a chess and cards board game, a business strategy game, a role-playing game, and the like. Specifically, the method may be applied to a scenario in which an object is displayed in a game interface of a horizontal-version action game, or a scenario in which an object is displayed in a game interface of a role-playing game, to save display space occupied by an object in a game interface, and improve the utilization of the display space of the game interface. The foregoing description is merely an example, which is not limiting.

In one embodiment, objects displayed in the game interface by default may all be referred to as the first object. A region used for displaying the first object in the game interface may be referred to as an object display region. All or part of the region other than the object display region in the game interface may be referred to as a non-object display region.

In one embodiment, the first object and the second object may be, but are not limited to, objects having the same function. For example, the first object and the second object may be, but are not limited to, different skills of the game character. Alternatively, the first object and the second object may be, but are not limited to, different equipment or props of the game character.

In one embodiment, the first object may include one or more objects. An example in which the object is a skill icon is used. The game interface may display, but not limited to, only one skill icon most frequently used or two or more icons relatively frequently used. The remaining skill icons are the second objects.

In one embodiment, the first operation may be an operation for triggering display of the second object. The type of the first operation may be a tap operation (for example, a tap or click operation on a touchscreen), a touch operation (for example, a touch operation on a touchscreen or a click by a pointer device such as a mouse), a slide operation (for example, a slide operation on a touchscreen), a key operation (for example, an operation on a key of a keyboard or a gamepad), a joystick operation (for example, an operation on a joystick of a gamepad or a notebook computer), and the like.

In one embodiment, the second operation may be an operation for triggering control of the game character performing the first target operation, and the third operation may be an operation for triggering control of the game character performing the second target operation. The types of the second operation and the third operation may be, but are not limited to, a tap operation, a touch operation, a slide operation, a key operation, a joystick operation, and the like. The second operation and the third operation may be operations of the same type.

The first operation may be an operation of a type different from that of the second operation and the third operation. For example, the first operation is a touch operation, and the second operation and the third operation are single-tap operations. When detecting a touch operation performed on the first object, the terminal displays the second object in the game interface in response to the touch operation. When detecting a single-tap operation performed on the first object, the terminal controls the game character to perform the first target operation.

Certainly, in some cases, the first operation may be an operation of the same type as that of the second operation and the third operation. For example, the first operation, the second operation, and the third operation are all touch operations, but a duration of the first operation is different from a duration of the second operation and a duration of the third operation. When detecting that a duration of a touch operation performed on the first object satisfies a first threshold, the terminal displays the second object in the game interface in response to the touch operation. When detecting that a duration of a touch operation performed on the first object satisfies a second threshold, the terminal controls the game character to perform the first target operation.

Figure 3:
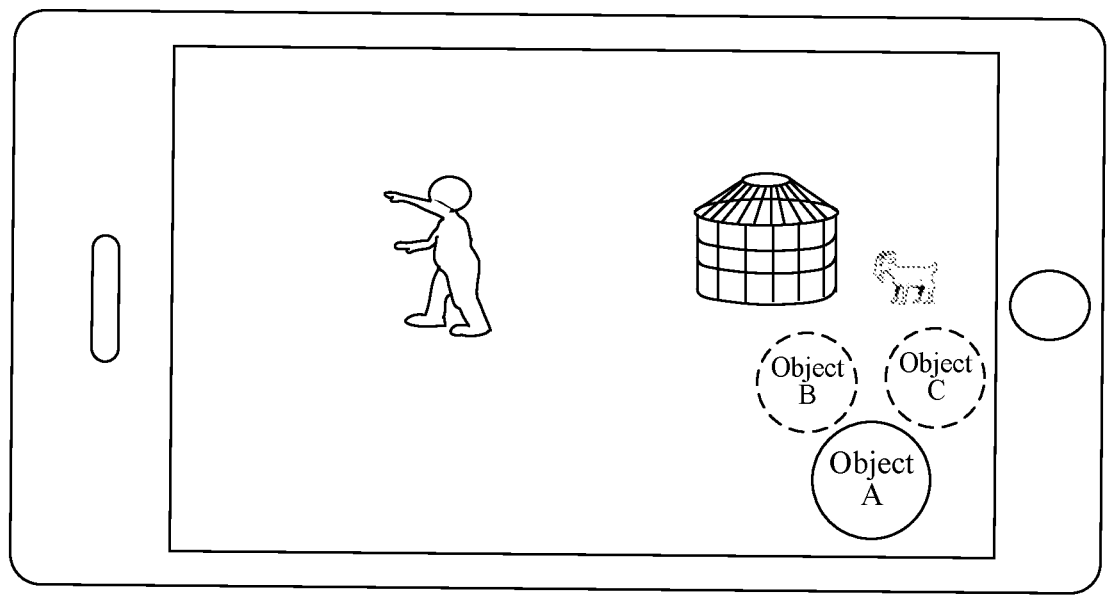
FIG. 3 is a schematic diagram of an object display method according to an embodiment of the present disclosure.
Figure 4:
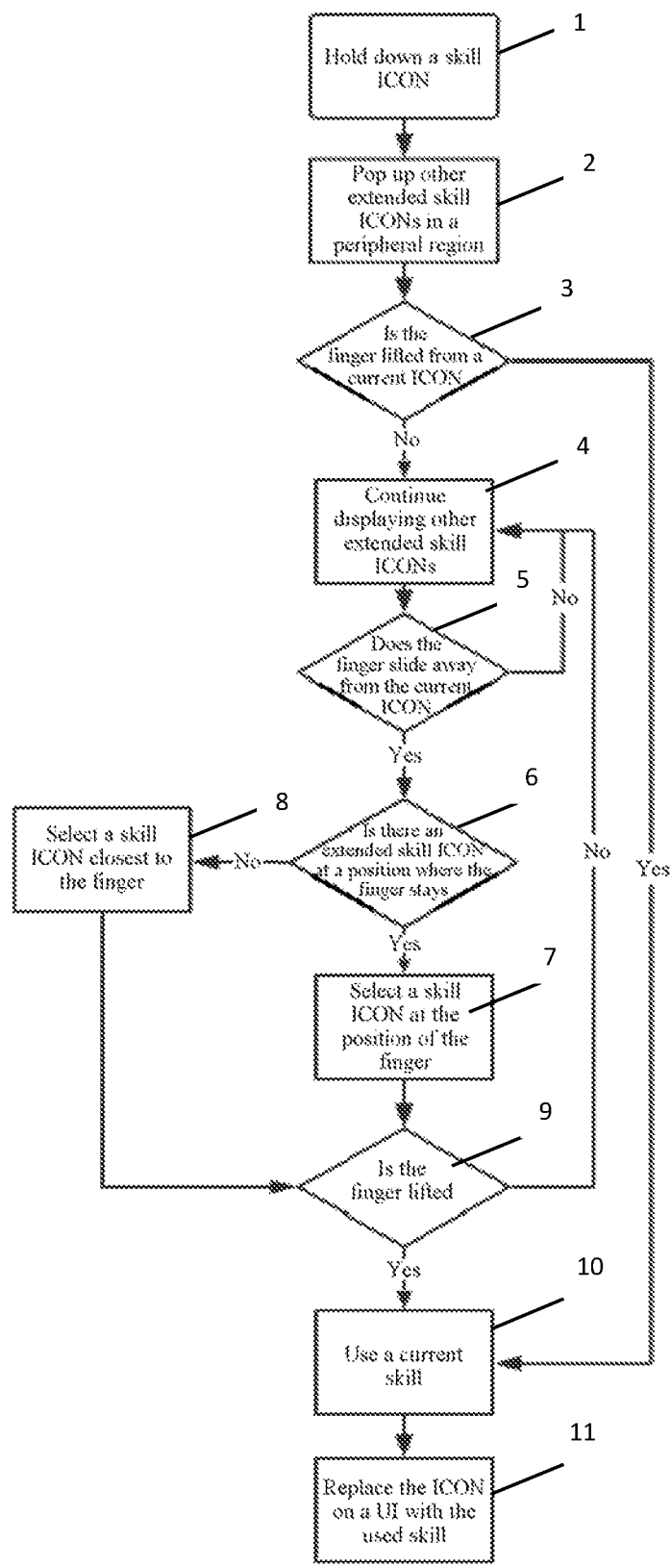
FIG. 4 is a schematic diagram of another object display method according to an embodiment of the present disclosure.

In one embodiment, the first target operation and the second target operation are different operations of the same type. An example in which the object is a skill icon displayed in the game interface is used. The first object and the second object are different skills of the game character. Controlling the game character to perform the first target operation or the second target operation may be controlling the game character to present different skill effects (including presenting a skill image, changing a character attribute, and the like). In an embodiment, an example in which a skill of the game character is displayed in the game interface of a touchscreen is used. As shown in FIG. 3, the first object is a skill A, and the second objects are a skill B and a skill C. As shown in FIG. 4, an object display process includes the followings.

Step 1: A terminal detects an operation of holding down a skill ICON, that is, the terminal detects a touch operation on the skill A shown in FIG. 3.

Step 2: The terminal pops up other extended skill ICONs in a peripheral region, that is, the terminal pops up ICONs of the skill B and the skill C in a peripheral region of the skill A.

Step 3: The terminal detects whether the finger is lifted from a current ICON, that is, the terminal detects whether the touch operation is ended on the ICON of the skill A, and if yes, performs step 10; otherwise, performs step 4.

Step 4: The terminal continues displaying other extended skills, that is, the terminal continues displaying the skill B and the skill C if the terminal does not detect that the touch operation is ended on the ICON of the skill A.

Step 5: The terminal detects whether the finger slides away from the current ICON, that is, the terminal detects whether the touch operation is changed into a slide operation, and if yes, performs step 6; otherwise, returns to step 4.

Step 6: The terminal detects whether there is an extended skill ICON at a position where the finger stays, that is, the terminal detects whether the slide operation slides to the display position of the skill B or the skill C, and if yes, performs step 7; otherwise, performs step 8.

Step 7: Select a skill ICON at a position of the finger, that is, determine a skill corresponding to a position that the slide operation slides to as a second object, for example, select an icon of the skill C, and continue to perform step 9.

Step 8: The terminal selects a skill ICON closest to the finger, that is, the terminal detects a distance between the position that the slide operation slides to and the skill B, and a distance between the position that the slide operation slides to and the skill C, and for example, selects the skill C if the distance between the position and the skill C is shorter.

Step 9: The terminal detects whether the finger is lifted, that is, the terminal detects whether the slide operation is ended at the current position, and if yes, performs step 10; otherwise, returns to step 4.

Step 10: Use a current skill, that is, the terminal controls the game character to release the skill C.

Step 11: The terminal replaces the ICON on the UI with the used skill, that is, the terminal replaces the icon of the skill A displayed in the object display region in the game interface with the icon of the skill C.

It may be learned that through the foregoing steps, the game interface on the terminal is divided into an object display region and a non-object display region. It is not necessary to display all objects in the object display region. The second object is hidden, and only the first object is displayed in the object display region. When detecting the first operation performed on the first object, the terminal displays the hidden second object in the game interface. In this way, the space for displaying objects in the game interface is saved, and the impact of the object used for controlling the game character to perform the target operation on game screen display is reduced, so that there is more sufficient space in the game interface for displaying the game scene or information such as other icons. Therefore, a technical effect of saving display space occupied by an object in a game interface and improving the utilization of the display space of the game interface is achieved, thereby resolving the technical problem in the related art that display space occupied by an object in a game interface is relatively large and consequently the utilization of the display space of the game interface is relatively low.

In one embodiment of the present disclosure, the terminal may display the second object in the non-object display region in the game interface in response to the first operation. Certainly, the terminal may also display the second object in the object display region, for example, replace the first object on which the first operation is performed with the second object. In an optional solution, that the terminal detects a first operation performed on the first object includes the followings.

S1: The terminal detects an operation performed on the first object.

S2: The terminal determines that the first operation is detected in a case that it is detected that one of the following operations is performed on the first object: a first touch operation, a first tap operation, and a first slide operation, the first touch operation being a touch operation performed on the first object for a duration that satisfies a first condition, the first tap operation being a tap operation that is performed on the first object and that triggers a first number of taps within a first time period, and the first slide operation being a slide operation that is performed on the first object and that slides in a first direction by using the first object as a starting point.

In one embodiment, the terminal may configure different types of operations as the first operation for triggering display of the second object, for example, a first touch operation that is continuously performed on the screen for a period of time, an operation that triggers several taps within a specific time period (a single-tap, a double-tap, a triple-tap, or the like), and a slide operation starting from the first object. For example, if detecting a single-tap operation performed on the first object, the terminal displays the second object. Alternatively, if detecting that a touch operation performed on the first object lasts for two seconds, the terminal displays the second object.

In one embodiment, for first objects of different types, a first operation for triggering display of the second object may be different operations. For example, first objects of a plurality of types, such as a skill icon, a setting icon, and a prop icon, are displayed in the game interface. The terminal may display one of icons of each type as the first object in the object display region, and hide other icons as the second object. The terminal configures, for icons of each type, an operation for triggering display of the second object. For example, when detecting a single-tap operation performed on the skill icon, the terminal displays the second object in the skill icon; when detecting a double-tap operation performed on the setting icon, the terminal displays the second object of the setting icon; and when detecting a touch operation that is performed on the prop icon and that lasts for two seconds, the terminal displays the second object in the prop icon. Alternatively, the terminal may set the same operation for triggering display of the second object for first objects of different types.

In an optional solution, that the terminal displays the second object in the non-object display region in the game interface in response to the first operation includes the followings.

S11: The terminal obtains, in response to the first operation, a hidden object corresponding to the first object from a displayed object and a hidden object that have a correspondence as the second object, the displayed object including the first object, the hidden object including the second object, and the displayed object being an object displayed in the object display region in the game interface.

S12: The terminal determines, in the non-object display region, a target region used for displaying the hidden object corresponding to the first object.

S13: The terminal displays the second object in the target region.

In one embodiment, objects that can be displayed in the game interface may be classified into a displayed object and a hidden object. The terminal may configure a correspondence between the displayed object and the hidden object. That is, the terminal determines which hidden object is displayed when detecting the first operation performed on a displayed object. The displayed objects include the first object, and the second object is a hidden object corresponding to the first object.

In one embodiment, the correspondence between the objects may be configured as described above. Alternatively, the terminal may configure a correspondence between the object display region and the object. A display region displaying an object corresponds to one or more objects. The terminal displays one of the objects as a displayed object in a display region corresponding thereto, and hides another object as a hidden object. When detecting a first operation performed on the displayed object, the terminal may display all objects corresponding to the display region, including the first object.

Figure 5:
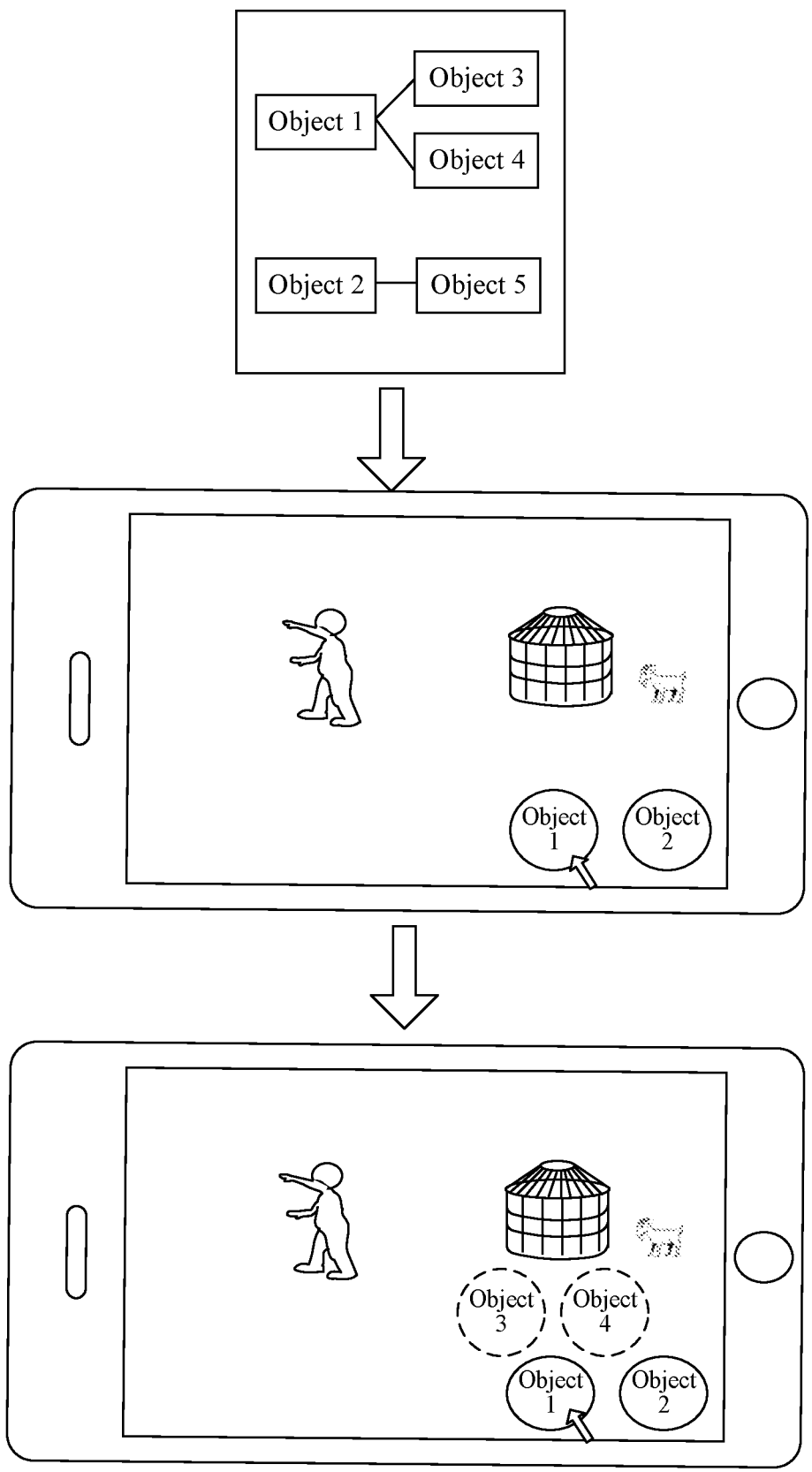
FIG. 5 is a schematic diagram of another object display method according to an embodiment of the present disclosure.

In an embodiment, as shown in FIG. 5, an object 1 and an object 2 are first objects, and an object 3 to an object 5 are second objects. The terminal may configure that the object 1 corresponds to the object 3 and the object 4, and the object 2 corresponds to the object 5. In the game interface, the object 1 and the object 2 are displayed. When detecting a first operation performed on the object 1, the terminal displays the object 3 and the object 4.

In another embodiment, the terminal may alternatively set that the object display region includes a region 1 and a region 2, and configure that the region 1 corresponds to the object 1, the object 3, and the object 4, and the region 2 corresponds to the object 2 and the object 5. The object 1 is displayed in the region 1, and the object 2 is displayed in the region 2. When detecting a first operation performed on the object 1, the terminal displays the object 1, the object 3, and the object 4. When detecting a first operation performed on the object 2, the terminal displays the object 2 and the object 5.

In one embodiment, a storage manner of the displayed object and the hidden object that have a correspondence may include storing an identifier of the displayed object and an identifier of the hidden object in a form of a table. When detecting that the first operation is performed on the first object, the terminal obtains an identifier of the first object in response to the first operation, determines an identifier of the hidden object corresponding to the identifier of the first object, and then obtains a display icon corresponding to the identifier of the hidden object from the storage space. The terminal displays the obtained display icon as the icon of the second object in the non-object display region in the game interface. An operation corresponding to the determined identifier of the hidden object may be used as a second target operation that the second object can control the game character to perform.

In an optional solution, that the terminal determines, in the non-object display region, a target region used for displaying the hidden object corresponding to the first object includes: determining, by the terminal, a region that is in the non-object display region and whose distance from the first object falls within a target threshold range as the target region.

In an optional solution, that the terminal displays the second object in the target region includes the followings.

S21: The terminal obtains a number of objects in the second object.

S22: The terminal divides, according to the number of objects, a corresponding region for each object in the second object in the target region for display.

In one embodiment, to facilitate subsequent operations on the first object and the second object, the region that is in the non-object display region and whose distance from the first object falls within the target threshold range may be a circular ring region having a display region of the first object as the center and a radius within the target threshold range, or a partial circular ring region located in a specific direction (for example, above) of the first object. The terminal divides the target region according to the number of the to-be-displayed second objects, and then displays the second object in the corresponding region obtained through division.

Figure 6:
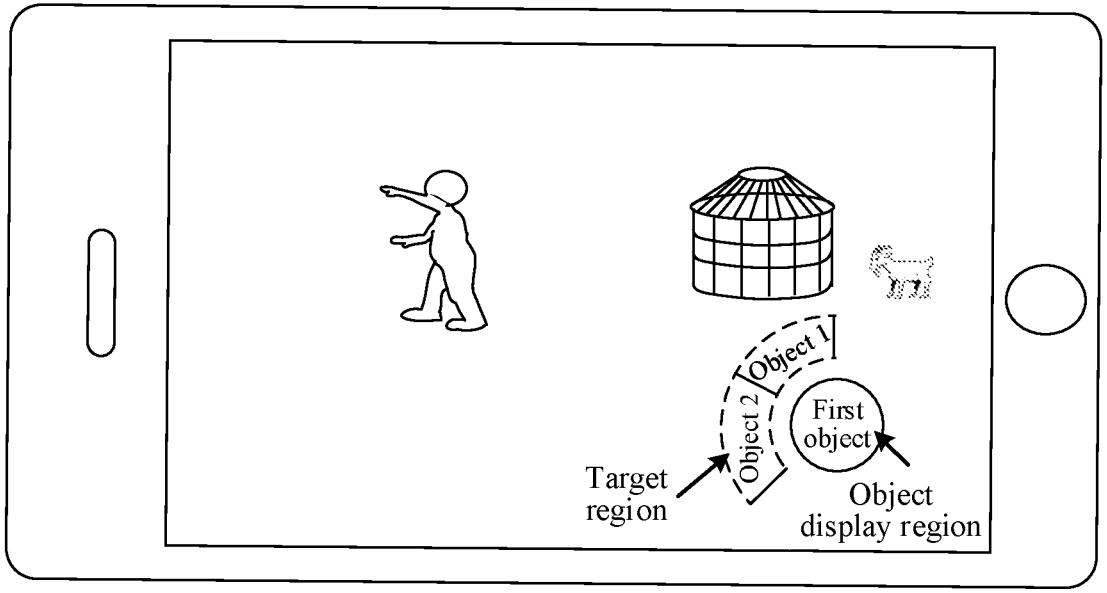
FIG. 6 is a schematic diagram of another object display method according to an embodiment of the present disclosure.

For example, as shown in FIG. 6, a first object is displayed in the game interface, a region displaying the first object is used as the object display region, and a region other than the object display region in the game interface is the non-object display region. The terminal determines a one-third circular ring region near the first object as the target region. There are two second objects, respectively being an object 1 and an object 2. The terminal divides the one-third circular ring region into two parts, for respectively displaying the object 1 and the object 2.

The position for displaying the second object is not necessarily near the first object, and may alternatively be any position in the non-object display region in the game interface. This is not limited herein. For example, the first object is displayed in the lower right corner of the game interface, and the second object may be displayed in the upper left corner of the game interface, thereby helping play the game with two hands.

In an optional solution, after the terminal displays the second object in the non-object display region in the game interface in response to the first operation, when detecting the second operation performed on the first object, the terminal controls, in response to the second operation, the game character to perform the first target operation. Alternatively, when detecting the third operation performed on the second object, the terminal controls, in response to the third operation, the game character to perform the second target operation.

For example, the first object and the second object are simultaneously displayed in the game interface. A user may select an object on which an operation needs to be performed, and the terminal performs a corresponding process in response to the operation of the user. Using skill release as an example, after the terminal detects an trigger for the first operation performed on the first object and then displays the second object, if detecting the second operation performed on the first object, the terminal controls the game character to release a skill (the first target operation) corresponding to the first object, and if detecting the third operation performed on the second object, the terminal controls the game character to release a skill (the second target operation) corresponding to the second object.

In one embodiment, each object may further have a cooldown period after being triggered. An object in the cooldown period may be set to be not allowed to be triggered before the cooldown period ends. When an object in such a state is displayed in the game interface, a translucent layer, but not limited thereto, may be displayed on the object, and a remaining cooldown period may be displayed on the layer in a countdown manner. After the countdown ends, the layer is no longer displayed, and the object returns to a state of being allowed to be triggered until the object is triggered again.

In one embodiment, in a case that the terminal detects the second operation performed on the first object, the terminal enters a cooldown period of the first object while controlling, in response to the second operation, the game character to perform the first target operation.

In an optional solution, that the terminal controls, in response to the third operation, the game character to perform the second target operation when the terminal detects the third operation performed on the second object includes the follows S31: The terminal detects an operation performed on the second object.

S32: The terminal determines that the third operation is detected in a case that the terminal detects that one of the following operations is performed on the second object: a second touch operation, a second tap operation, and a second slide operation, the second touch operation being a touch operation performed on the second object for a duration that satisfies a second condition, the second tap operation being a tap operation that is performed on the second object and that triggers a second number of taps within a second time period, and the second slide operation being a slide operation performed on the second object by using the first object as a starting point and the second object as an end point, or a slide operation of sliding in a second direction by using the second object as a starting point.

S33: The terminal controls, in response to the third operation, the game character to perform the second target operation.

In one embodiment, the third operation for triggering the function of the second object may be in a plurality of forms, for example, a second touch operation, a second tap operation, and a second slide operation. The second touch operation is a touch operation performed on the second object for a duration that satisfies a second condition (for example, a touch operation performed on the second object for a duration between 2 and 5 seconds, where triggering of the second object may be canceled if the duration of the touch operation exceeds 5 seconds). The second tap operation is a tap operation that is performed on the second object and that triggers a second number of taps triggers several taps within a second time period (a single-tap, a double-tap, a triple-tap, or the like). The second slide operation is a slide operation performed on the second object by using the first object as a starting point and the second object as an end point (for example, a slide operation of sliding from the first object to the second object), or a slide operation of sliding in a second direction by using the second object as a starting point (a slide operation starting from the second object in a specific direction, where the direction may represent an operation direction of the second target operation).

In an optional solution, the second object includes a plurality of objects, and that the terminal controls, in response to the third operation, the game character to perform the second target operation when the terminal detects the third operation performed on the second object includes the followings.

S41: The terminal determines position relationships between an operation position of the third operation and the plurality of objects when detecting that the third operation is performed on the second object.

S42: The terminal determines, in the plurality of objects, an object of which the position relationship satisfies a target position relationship as a target object.

S43: The terminal controls, in response to the third operation, the game character to perform the second target operation corresponding to the target object.

In one embodiment, the terminal may determine, according to the position relationships between the operation position of the third operation and display positions of the plurality of objects in the second object, the target object for responding to the third operation.

Figure 7:
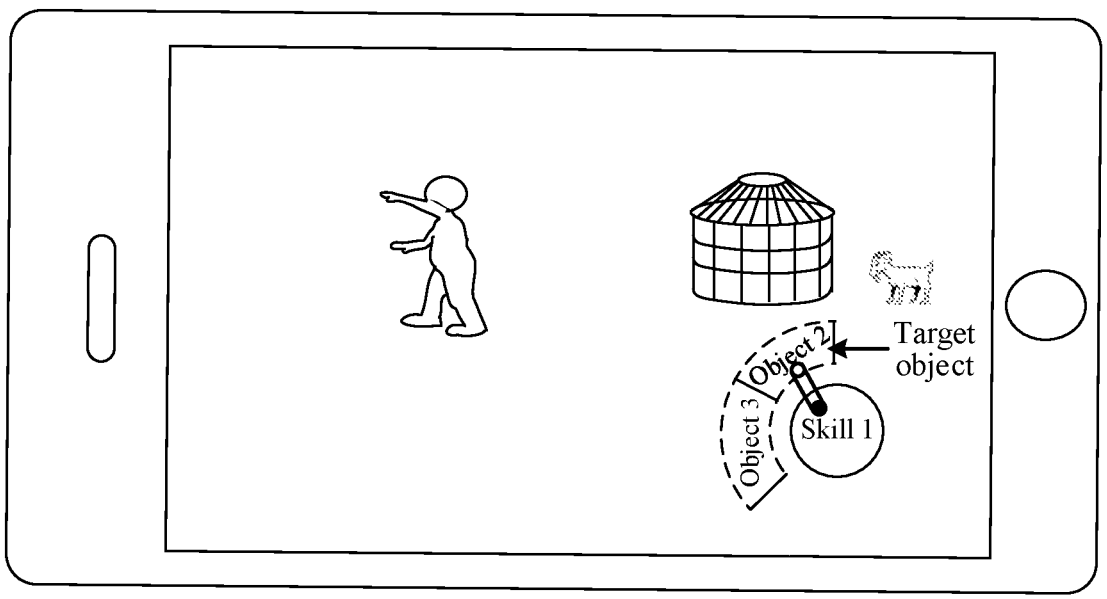
FIG. 7 is a schematic diagram of another object display method according to an embodiment of the present disclosure.

In an embodiment, an example of skill release of the game character is used. As shown in FIG. 7, the first object (the icon of a skill 1) is displayed in the object display region in the game interface. The terminal detects that a touch operation on the skill 1 lasts for two seconds (as shown by the black dot in FIG. 7), and displays the second object (a skill 2 and a skill 3, where the skill 2 is an object 2, and the skill 3 is an object 3) around the skill 1 in response to the touch operation. If the terminal detects that the finger of the user does not leave the screen, and the finger of the user moves from the position of the icon of the skill 1 to the position of an icon of the skill 2 and then leaves the screen (as shown by the white dot in FIG. 7), the terminal determines the skill 2 as the target object and controls the game character to release the skill 2.

In an optional solution, that the terminal determines, in the plurality of objects, an object of which the position relationship satisfies a target position relationship as a target object includes one of the following:

determining, by the terminal, an object corresponding to a target region that the operation position falls within in the non-object display region as the target object; or determining, by the terminal, an object in the plurality of objects that is closest to the operation position as the target object.

In one embodiment, the terminal may determine an object corresponding to a region that the operation position of the third operation falls within as the target object. Alternatively, the terminal may determine an object closest to the operation position of the third operation as the target object.

The manner in which the terminal determines the target object according to the position relationship is not limited to the above. This is not limited in one embodiment. For example, the terminal may alternatively determine an object through which a connection line between the operation position of the third operation and the first object passes as the target object.

In an optional solution, after the terminal controls, in response to the third operation, the game character to perform the second target operation, the method further includes:

replacing, by the terminal, the first object displayed in the object display region in the game interface with the second object.

In one embodiment, the terminal may replace the first object displayed in the object display region in the game interface with the selected second object, to help the function of the second object to be triggered again.

In one embodiment, the game records a correspondence between the first object displayed in the object display region and the first target operation that the game character is controlled by performing the second operation on the first object to perform. When replacing the icon of the first object displayed in the object display region in the game interface with the icon of the second object, the terminal may replace the foregoing correspondence recorded in the game with a correspondence between the second object and the second target operation that the game character is controlled by performing the third operation on the second object to perform. That is, the terminal uses the second object as the new displayed object, and uses related information of the second object as information about the displayed object.

In an optional solution, after the terminal replaces the first object displayed in the object display region in the game interface with the second object, the method further includes one of the following:

displaying, by the terminal, the first object in the non-object display region in the game interface in response to the first operation in a case that it is detected that the first operation is performed on the second object; or
controlling, by the terminal in response to the third operation, the game character to perform the second target operation in a case that it is detected that the third operation is performed on the second object.

In one embodiment, after replacing the first object with the second object, the terminal may configure the first object as a hidden object corresponding to the second object. If detecting that the first operation for triggering display of the hidden object is performed on the second object, the terminal may display the first object in the non-object display region. If detecting that the second operation is performed on the first object, the terminal may control, in response to the second operation, the game character to perform the first target operation.

In one embodiment, the second object displayed in the object display region by the terminal may directly control, in response to the detected third operation performed on the second object, the game character to perform the second target operation.

In one embodiment, the first operation is an operation for triggering to display a hidden object in the game interface. When the displayed object in the game interface is the second object, the first operation performed on the second object may also be used to trigger to display the first object as the hidden object in the game interface.

In one embodiment, the operation performed on the second object for triggering to display the hidden object in the game interface may alternatively be different from the first operation performed on the first object for triggering to display the hidden object in the game interface. For example, a single-tap operation performed on the first object may trigger to display the second object, and a touch operation performed on the second object may trigger to display the first object.

For ease of description, the foregoing method embodiments are stated as a series of action combinations. However, a person skilled in the art needs to learn that the present disclosure is not limited to the described sequence of the actions because according to the present disclosure, some steps may use another sequence or may be simultaneously performed. In addition, it is to be understood by a person skilled in the art that the embodiments described in the specification are all exemplary embodiments and the related actions and modules are not mandatory to the present disclosure.

Figure 8:
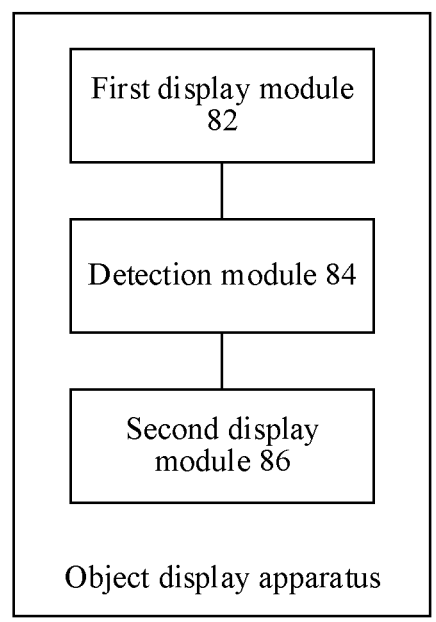
FIG. 8 is a schematic diagram of an object display apparatus according to an embodiment of the present disclosure.

According to another aspect of the embodiments of the present disclosure, an object display apparatus for implementing the foregoing object display method is further provided. As shown in FIG. 8, the apparatus includes:

a first display module 82, configured to display a first object in an object display region in a game interface;
a detection module 84, configured to detect a first operation performed on the first object, the first object being used for controlling, in response to a second operation performed on the first object, a game character to perform a first target operation; and
a second display module 86, configured to display a second object in the game interface in response to the first operation in a case that the detection module 84 detects the first operation performed on the first object, the second object being used for controlling, in response to a third operation performed on the second object, the game character to perform a second target operation.

It may be learned that through the foregoing apparatus, the game interface is divided into an object display region and a non-object display region. It is not necessary to display all objects in the object display region. The second object is hidden, and only the first object is displayed in the object display region. When the first operation performed on the first object is detected, the hidden second object is displayed in the game interface. In this way, the space for displaying objects in the game interface is saved, and the impact of the object used for controlling the game character to perform the target operation on game screen display is reduced, so that there is more sufficient space in the game interface for displaying the game scene or information such as other icons. Therefore, a technical effect of saving display space occupied by an object in a game interface and improving the utilization of the display space of the game interface is achieved, thereby resolving the technical problem in the related art that display space occupied by an object in a game interface is relatively large and consequently the utilization of the display space of the game interface is relatively low.

In an optional solution, the second display module is configured to display the second object in a non-object display region in the game interface in response to the first operation.

In an optional solution, the detection module includes a first detection unit and a first determining unit. The first detection unit is configured to detect an operation performed on the first object. The first determining unit is configured to determine that the first operation is detected in a case that it is detected that one of the following operations is performed on the first object: a first touch operation, a first tap operation, and a first slide operation, the first touch operation being a touch operation performed on the first object for a duration that satisfies a first condition, the first tap operation being a tap operation that is performed on the first object and that triggers a first number of taps within a first time period, and the first slide operation being a slide operation that is performed on the first object and that slides in a first direction by using the first object as a starting point.

In an optional solution, the second display module includes an obtaining unit, a determining unit, and a display unit.

The obtaining unit is configured to obtain, in response to the first operation, a hidden object corresponding to the first object from a displayed object and a hidden object that have a correspondence as the second object, the displayed object including the first object, the hidden object including the second object, and the displayed object being an object displayed in the object display region in the game interface.

The determining unit is configured to determine, in the non-object display region, a target region used for displaying the hidden object corresponding to the first object. The display unit is configured to display the second object in the target region.

In an optional solution, the determining unit includes a first determining subunit, configured to determine a region that is in the non-object display region and whose distance from the first object falls within a target threshold range as the target region.

In an optional solution, the display unit includes an obtaining subunit, configured to obtain a number of objects in the second object; and a division subunit, configured to divide, according to the number of objects, a corresponding region for each object in the second object in the target region for display.

In an optional solution, the apparatus further includes one of a first control module and a second control module.

The first control module is configured to control, in response to the second operation, the game character to perform the first target operation in a case that it is detected that the second operation is performed on the first object; and the second control module is configured to control, in response to the third operation, the game character to perform the second target operation in a case that it is detected that the third operation is performed on the second object.

In an optional solution, the second control module includes a second detection unit, a second determining unit, and a first control unit.

The second detection unit is configured to detect an operation performed on the second object. The second determining unit is configured to determine that the third operation is detected in a case that it is detected that one of the following operations is performed on the second object: a second touch operation, a second tap operation, and a second slide operation, the second touch operation being a touch operation performed on the second object for a duration that satisfies a second condition, the second tap operation being a tap operation that is performed on the second object and that triggers a second number of taps within a second time period, and the second slide operation being a slide operation performed on the second object by using the first object as a starting point and the second object as an end point, or a slide operation of sliding in a second direction by using the second object as a starting point. The first control unit is configured to control, in response to the third operation, the game character to perform the second target operation.

In an optional solution, the second object includes a plurality of objects, and the second control module includes a third determining unit, a fourth determining unit, and a second control unit.

The third determining unit is configured to determine position relationships between an operation position of the third operation and the plurality of objects in a case that it is detected that the third operation is performed on the second object. The fourth determining unit is configured to determine, in the plurality of objects, an object of which the position relationship satisfies a target position relationship as a target object. The second control unit is configured to control, in response to the third operation, the game character to perform the second target operation corresponding to the target object.

In an optional solution, the fourth determining unit includes one of a second determining subunit and a third determining subunit.

The second determining subunit is configured to determine an object corresponding to a target region that the operation position falls within in the non-object display region as the target object. The third determining subunit is configured to determine an object in the plurality of objects that is closest to the operation position as the target object.

In an optional solution, the apparatus further includes a replacement module, configured to replace the first object displayed in the object display region in the game interface with the second object.

In an optional solution, the apparatus further includes one of a third display module and a third control module.

The third display module is configured to display the first object in the non-object display region in the game interface in response to the first operation in a case that it is detected that the first operation is performed on the second object. The third control module is configured to control, in response to the third operation, the game character to perform the second target operation in a case that it is detected that the third operation is performed on the second object.

For an application environment of one embodiment of the present disclosure, reference may be made to, but not limited to the application environment of the foregoing embodiment. The details are not described again herein.

Figure 9:
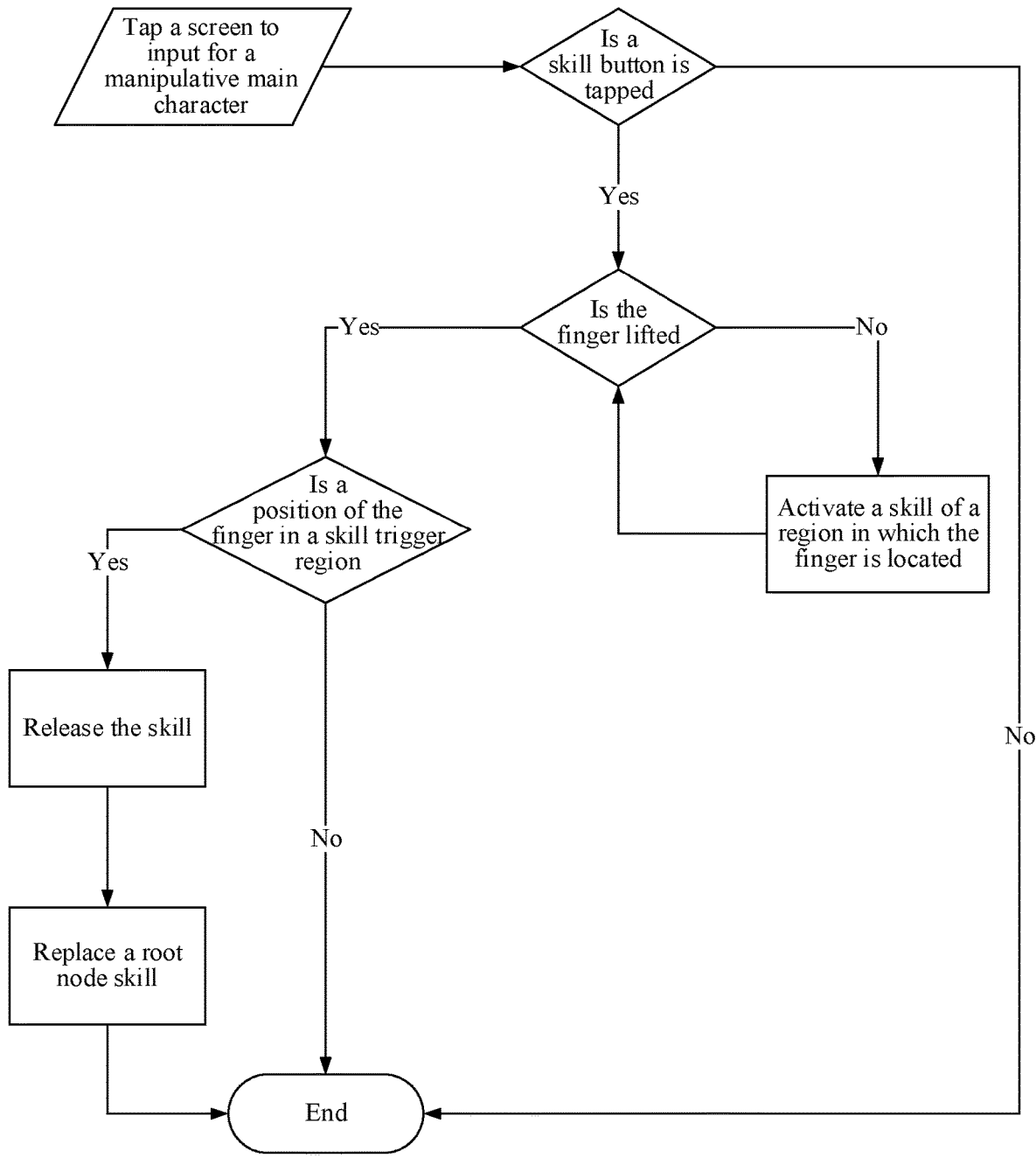
FIG. 9 is a schematic diagram of an application scenario of an object display method according to an embodiment of the present disclosure.

Further, in another embodiment, the foregoing object display method may be applied to a scenario of displaying an object in a game interface shown in FIG. 9.

The biggest difficulty in mobile phone games is that, limited by the size of a screen and the size of a touch region, a requirement of selecting a plurality of skill points by using sufficient UIs in a single battle in a game cannot be satisfied. In most of existing games on the market, skill ICONs and skills are in a one-to-one correspondence, that is, an ICON at a UI position of a skill corresponds to a fixed skill. Consequently, the number of skills that can be brought into the battle in a single game is limited by the screen size and the trigger range. In a case that the size of the UI and the size of the ICON remain unchanged, if more UIs are added, an actual visual range of the game is smaller. However, if the UI and the ICON are scaled down to satisfy a requirement for adding more UIs, the trigger range of the skill ICON is also reduced, greatly affecting operation experience of the player.

In this scenario, a manner of using a single skill UI and performing intelligent multi-skill extension according to operations of the player is provided, to meet requirement of the player for using skills in the battle under the limitation in the number of UIs in the mobile phone game.

When the player holds down an ICON on a fixed skill UI in the game by using a finger, the terminal pops up a plurality of different skill ICONs around according to system settings or settings of the player. In this case, the player may slide the finger in a direction toward a needed skill ICON, and lift the finger from a to-be-used skill ICON, so that the terminal controls a player character in the game to release a skill corresponding to the current ICON. When the player lifts the finger, the plurality of skill ICONs that the terminal pops up around disappear, and the ICON in the fixed skill UI is replaced with the ICON of the released skill, to satisfy a requirement of the player for using the skill again soon.

In this scenario, when the finger taps on a skill button, the terminal unfolds all folded skill buttons of the current skill button. The terminal activates skills of a child layer according to the position that the finger slides to, and determines a to-be-released skill according to a skill activation region in which a position at which the finger is lifted is located.

The player touches the screen, and the terminal detects a coordinate range of the tap. When the coordinate range of the tap falls within a detection range of a skill button A:
1. The terminal divides, around the skill button A, an outer region of the skill button within a range of a radius R into several sub-regions, displays a sub-skill panel S and sub-skill icons thereof, and binds sub-skills thereof.
2. The terminal performs loop detection a coordinate position of the finger of the player.
3. When the finger of the player slides on the screen, and coordinates of a sliding position exceed the range of the skill button A and enter the range of the radius R:
   (a) the finger of the player slides, and the terminal highlights the sub-regions divided in step 1 according to the coordinate position of the finger;
   (b) the finger of the player leaves the screen, the terminal releases a child-layer skill B that is currently activated and replaces the parent-layer skill button A with B to release the skill B, and at the same time, the skill starts a cooldown countdown; and
   (c) the terminal hides the child-layer skill panel S.
4. The finger of the player leaves the screen, and the terminal determines screen coordinates of the finger when the finger leaves the screen.
   (a) If the coordinates fall within the range of the icon of the skill A, the terminal directly releases the skill A, and at the same time, the skill starts a cooldown countdown.
   (b) If the coordinates are outside the radius R, the terminal cancels skill release.
   (c) The terminal hides the child-layer skill panel S.

In the foregoing manner, an operation manner completely satisfies a player's usual habit of using a terminal such as a mobile phone, and an infinite number of extended skills may be added.

Figure 10:
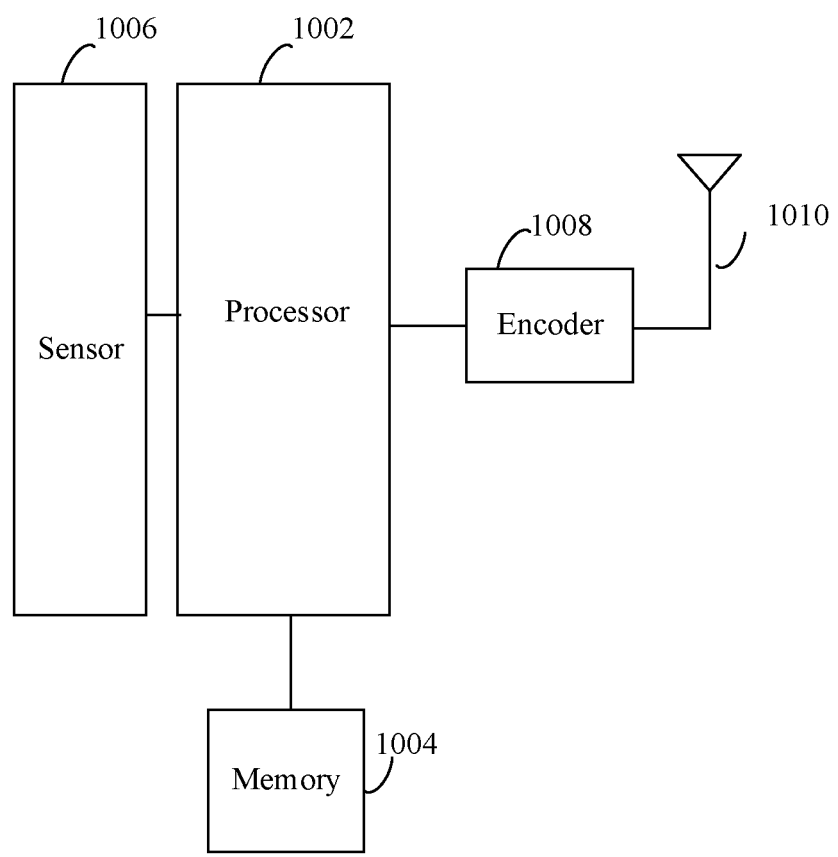
FIG. 10 is a schematic diagram of an electronic device according to an embodiment of the present disclosure.

According to still another aspect of the embodiments of the present disclosure, an electronic device configured to implement the foregoing object display method is further provided. As shown in FIG. 10, the electronic device includes: one or more (only one is shown in the figure) processors 1002, a memory 1004, a sensor 1006, an encoder 1008, and a transmission apparatus 1010. The memory stores a computer program, and the processor is configured to perform the steps in any one of the foregoing method embodiments through the computer program.

In one embodiment, the electronic device may be located in at least one of a plurality of network devices in a computer network.

In one embodiment, the processor may be configured to perform the following steps through the computer program:
S1: Display a first object in an object display region in a game interface.
S2: Display, in a case that a first operation performed on the first object is detected, a second object in the game interface in response to the first operation.

The first object is used for controlling, in response to a second operation performed on the first object, a game character to perform a first target operation, and the second object is used for controlling, in response to a third operation performed on the second object, the game character to perform a second target operation.

Optionally, a person of ordinary skill in the art may understand that, the structure shown in FIG. 10 is only illustrative. The electronic device may be a terminal device such as a smartphone (for example, an Android mobile phone or an iOS mobile phone), a tablet computer, a palmtop computer, a mobile Internet device (MID), or a PAD. FIG. 10 does not constitute a limitation on the structure of the foregoing electronic device. For example, the electronic device may further include more or fewer components (such as a network interface and a display apparatus) than those shown in FIG. 10, or have a configuration different from that shown in FIG. 10.

The memory 1002 may be configured to store a software program and module, for example, a program instruction/module corresponding to the object display method and apparatus in the embodiments of the present disclosure. The processor 1004 runs the software program and module stored in the memory 1002, to perform various functional applications and data processing, that is, implement the foregoing object display method. The memory 1002 may include a high-speed random memory, and may further include a non-volatile memory such as one or more magnetic storage apparatuses, a flash memory, or another non-volatile solid-state memory. In some embodiments, the memory 1002 may further include memories remotely disposed relative to the processor 1004, and the remote memories may be connected to a terminal through a network. An example of the network includes the Internet, an intranet, a local area network, a mobile communication network, and a combination thereof.

The transmission apparatus 1010 is configured to receive or transmit data through a network. Specific examples of the foregoing network may include a wired network and a wireless network. In an example, the transmission apparatus 1010 includes a network interface controller (NIC). The NIC may be connected to another network device and a router through a network cable, so as to communicate with the Internet or a local area network. In an example, the transmission apparatus 1010 is a radio frequency (RF) module, configured to communicate with the Internet in a wireless manner.

Specifically, the memory 1002 is configured to store an application.

An embodiment of the present disclosure further provides a storage medium, storing a computer program, the computer program being configured to perform, when run, the steps in any one of the foregoing method embodiments.

Optionally, the storage medium is further configured to store a computer program used for performing the steps included in the method in the foregoing embodiments. Details are not described again in one embodiment.

In one embodiment, a person of ordinary skill in the art may understand that all or some of the steps of the methods in the foregoing embodiments may be implemented by a program instructing relevant hardware of the terminal device. The program may be stored in a computer-readable storage medium, and the storage medium may include a flash memory, a read-only memory (ROM), a random access memory (RAM), a magnetic disk, an optical disc, or the like.

The sequence numbers of the embodiments of the present disclosure are merely for description purpose, and do not indicate the preference among the embodiments.

In a case that the integrated unit in the foregoing embodiments is implemented in the form of a software functional unit and sold or used as an independent product, the integrated unit may be stored in the foregoing computer-readable storage medium. Based on such an understanding, the technical solutions in the present disclosure essentially, or the part contributing to the related art, or all or some of the technical solutions may be implemented in a form of a software product. The computer software product is stored in a storage medium and includes several instructions for instructing one or more computer devices (which may be a personal computer, a server, a network device, or the like) to perform all or some of steps of the methods in the embodiments of the present disclosure.

In the foregoing embodiments of the present disclosure, descriptions of the embodiments have different emphases. As for parts that are not described in detail in one embodiment, reference may be made to the relevant descriptions of the other embodiments.

In the embodiments of the present disclosure, the first object is displayed in the object display region in the game interface; and in a case that it is detected that the first operation is performed on the first object, the second object is displayed in the game interface in response to the first operation. The first object is used for controlling, in response to the second operation performed on the first object, the game character to perform the first target operation, and the second object is used for controlling, in response to the third operation performed on the second object, the game character to perform the second target operation. The game interface is divided into an object display region and a non-object display region. It is not necessary to display all objects in the object display region. The second object is hidden, and only the first object is displayed in the object display region. When the first operation performed on the first object is detected, the hidden second object is displayed. In this way, the space for displaying objects in the game interface is saved, and the impact of the object used for controlling the game character to perform the target operation on game screen display is reduced, so that there is more sufficient space in the game interface for displaying the game scene or information such as other icons. Therefore, a technical effect of saving display space occupied by an object in a game interface and improving the utilization of the display space of the game interface is achieved, thereby resolving the technical problem in the related art that display space occupied by an object in a game interface is relatively large and consequently the utilization of the display space of the game interface is relatively low.

In the several embodiments provided in the present disclosure, it is to be understood that the disclosed client may be implemented in another manner. The described apparatus embodiments are merely exemplary. For example, the unit division is merely logical function division and may be another division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between units or modules may be implemented in electronic or other forms.

The units described as separate parts may or may not be physically separate, and the parts displayed as units may or may not be physical units, and may be located in one position, or may be distributed on a plurality of network units. Some or all of the units may be selected according to actual requirements to achieve the objectives of the solutions in the embodiments.

In addition, functional units in the embodiments of the present disclosure may be integrated into one processing unit, or each of the units may exist alone physically, or two or more units are integrated into one unit. The integrated unit may be implemented in the form of hardware, or may be implemented in the form of a software function unit.

The foregoing descriptions are merely exemplary implementations of the present disclosure. A person of ordinary skill in the art may make several improvements and modifications without departing from the principle of the present disclosure, and the improvements and modifications shall fall within the protection scope of the present disclosure.

What is claimed is:

1. An object display method for a terminal, comprising:
   displaying, on a display screen of the terminal, a virtual character in a virtual scene and a first user interface (UI) element;
   in response to detecting a trigger operation on the first UI element, displaying at least two second UI elements associated with the first UI element in a target display region, the trigger operation being a user selection operation detected by the terminal;
   in response to detecting that the trigger operation moves from the first UI element and terminates at a position corresponding to a target second UI element of the at least two second UI elements, controlling the virtual character to perform a first target operation corresponding to the target second UI element and stopping displaying the at least two second UI elements in the target display region; and
   in response to detecting that the trigger operation terminates at the first UI element, directly stopping displaying the at least two second UI elements in the target display region.

2. The method according to claim 1, further comprising:
   in response to detecting that the trigger operation terminates at the first UI element, controlling the virtual character to perform a second target operation corresponding to the first UI element.

3. The method according to claim 1, wherein the trigger operation on the first UI element that triggers displaying of the at least two second UI elements in the target display region includes one of is one of:
   a first touch operation performed on the first UI element for a duration that satisfies a first condition,
   a first tap operation performed on the first UI element and that triggers a first number of taps within a first time period, and
   a first slide operation performed on the first UI element and that slides in a first direction by using the first UI element as a starting point.

4. The method according to claim 1, further comprising:
when the position that the trigger operation terminates is not a display region of any UI element, determining a second UI element located closest to the position that the trigger operation terminates as the target second UI element.

5. The method according to claim 1, wherein:
a distance between the first UI element and one of the at least two second UI elements in the target display region falls within a target threshold range.

6. The method according to claim 1, wherein the trigger operation that moves from the first UI element and terminates at a position corresponding to a target second UI element of the at least two second UI elements includes:
a second slide operation by using the first UI element as a starting point and the target second UI element as an end point, or a slide operation of sliding in a second direction towards the target second UI element.

7. The method according to claim 1, further comprising:
in response to detecting that the trigger operation moves away from the first UI element, determining a current position of the trigger operation and selecting a candidate second UI element according to the current position of the trigger operation,
wherein the target second UI element is the selected candidate second UI element when the trigger operation terminates.

8. The method according to claim 7, wherein selecting a candidate second UI element according to the current position of the trigger operation comprises:
when the current position of the trigger operation is at one of the at least two second UI elements, selecting the second UI element located at the current position as the candidate second UI element; and
when the current position of the trigger operation is not at one of the at least two second UI elements, selecting the second UI element located closest to the current position as the candidate second UI element.

9. The method according to claim 1, wherein after the controlling the virtual character to perform a first target operation corresponding to the target second UI element, the method further comprises:
replacing the first UI element displayed in an object display region with the target second UI element.

10. The method according to claim 9, wherein after replacing the first UI element with the second UI element, the method further comprises:
in response to detecting the trigger operation on the target second UI element, displaying at least two third UI elements associated with the second UI element in the target display region, the first UI element being one of the at least two third UI elements; or
controlling, in response to a selection operation on target second UI element, controlling the virtual character to perform the first target operation corresponding to the target second UI element.

11. A terminal device, comprising:
a memory storing computer program instructions;
a display screen; and
a processor coupled to the memory and, when executing the computer program instructions, configured to perform:
displaying, on the display screen, a virtual character in a virtual scene and a first user interface (UI) element;
in response to detecting a trigger operation on the first UI element, displaying at least two second UI elements associated with the first UI element in a target display region, the trigger operation being a user selection operation detected by the terminal;
in response to detecting that the trigger operation moves from the first UI element and terminates at a position corresponding to a target second UI element of the at least two second UI elements, controlling the virtual character to perform a first target operation corresponding to the target second UI element and stopping displaying the at least two second UI elements in the target display region; and
in response to detecting that the trigger operation terminates at the first UI element, directly stopping displaying the at least two second UI elements in the target display region.

12. The terminal device according to claim 11, wherein the processor is further configured to perform:
in response to detecting that the trigger operation terminates at the first UI element, controlling the virtual character to perform a second target operation corresponding to the first UI element.

13. The terminal device according to claim 11, wherein the trigger operation on the first UI element that triggers displaying of the at least two second UI elements in the target display region includes one of is one of:
a first touch operation performed on the first UI element for a duration that satisfies a first condition,
a first tap operation performed on the first UI element and that triggers a first number of taps within a first time period, and
a first slide operation performed on the first UI element and that slides in a first direction by using the first UI element as a starting point.

14. The terminal device according to claim 11, wherein the processor is further configured to perform:
when the position that the trigger operation terminates is not a display region of any UI element, determining a second UI element located closest to the position that the trigger operation terminates as the target second UI element.

15. The terminal device according to claim 11, wherein:
a distance between the first UI element and one of the at least two second UI elements in the target display region falls within a target threshold range.

16. The terminal device according to claim 11, wherein the trigger operation that moves from the first UI element and terminates at a position corresponding to a target second UI element of the at least two second UI elements includes:
a second slide operation by using the first UI element as a starting point and the target second UI element as an end point, or a slide operation of sliding in a second direction towards the target second UI element.

17. The terminal device according to claim 11, wherein the processor is further configured to perform: in response to detecting that the trigger operation moves away from the first UI element, determining a current position of the trigger operation and selecting a candidate second UI element according to the current position of the trigger operation,
wherein the target second UI element is the selected candidate second UI element when the trigger operation terminates.

18. The terminal device according to claim 17, wherein selecting a candidate second UI element according to the current position of the trigger operation comprises:
when the current position of the trigger operation is at one of the at least two second UI elements, selecting the second UI element located at the current position as the candidate second UI element; and when the current position of the trigger operation is not at one of the at least two second UI elements, selecting the second UI element located closest to the current position as the candidate second UI element.

19. The terminal device according to claim 11, wherein after the controlling the virtual character to perform a first target operation corresponding to the target second UI element, the processor is further configured to perform:
replacing the first UI element displayed in the object display region with the target second UI element.

20. A non-transitory computer-readable storage medium storing computer program instructions executable by at least one processor to perform:
displaying, on a display screen coupled to the at least one processor, a virtual character in a virtual scene and a first user interface (UI) element;
in response to detecting a trigger operation on the first UI element, displaying at least two second UI elements associated with the first UI element in a target display region, the trigger operation being a user selection operation detected by the terminal;
in response to detecting that the trigger operation moves from the first UI element and terminates at a position corresponding to a target second UI element of the at least two second UI elements, controlling the virtual character to perform a first target operation corresponding to the target second UI element and stopping displaying the at least two second UI elements in the target display region; and
in response to detecting that the trigger operation terminates at the first UI element, directly stopping displaying the at least two second UI elements in the target display region.

* * * * *